Figure 6:
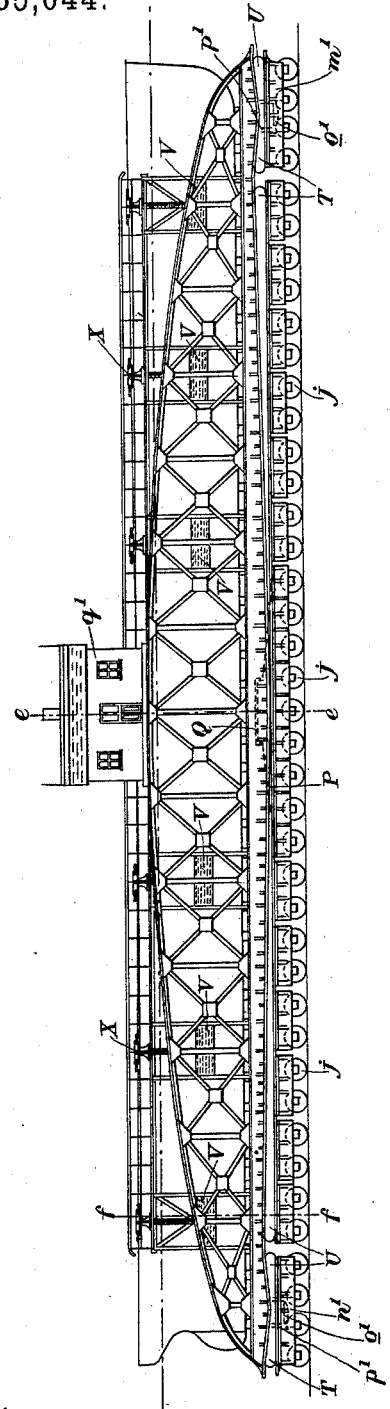

(No Model.) 5 Sheets—Sheet 1.
W. R. KINIPPLE.
APPARATUS FOR CARRYING SHIPS, &c., UPON RAILWAYS.
No. 485,044. Patented Oct. 25, 1892.
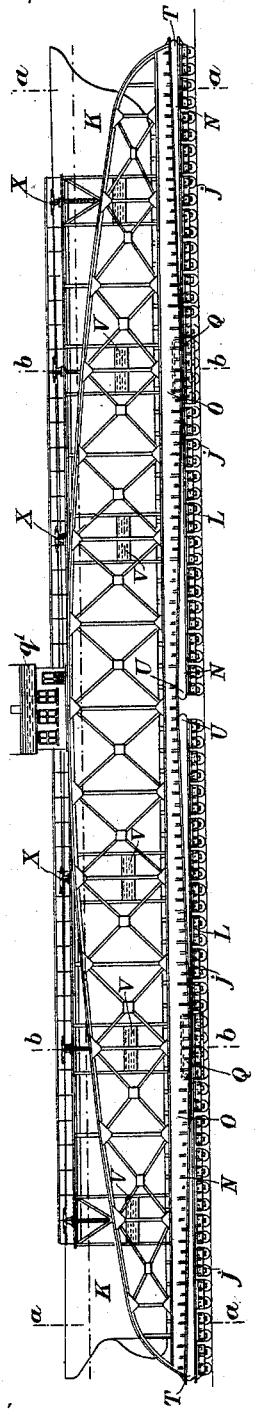
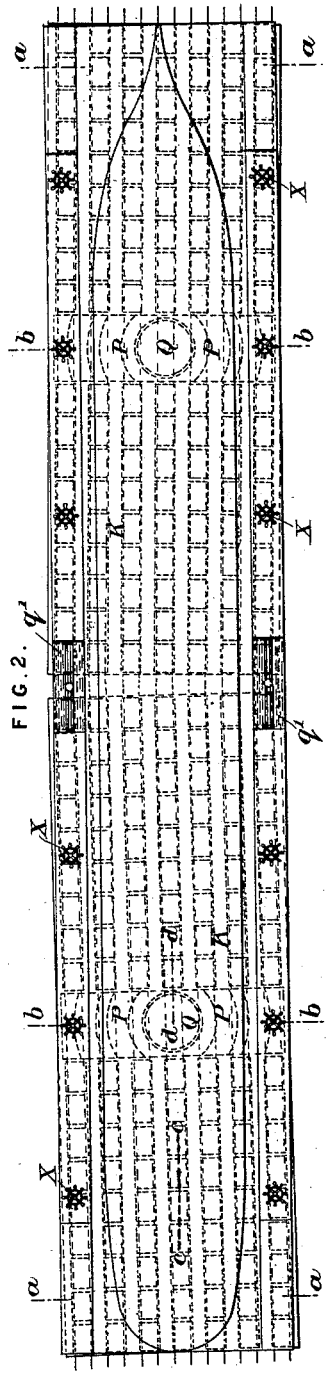
Attest:
Geo. T. Smallwood.
Reeves Lewis.
Inventor:
Walter R. Kinipple,
by his attorneys.

(No Model.) 5 Sheets—Sheet 2.
W. R. KINIPPLE.
APPARATUS FOR CARRYING SHIPS, &c., UPON RAILWAYS.
No. 485,044. Patented Oct. 25, 1892.
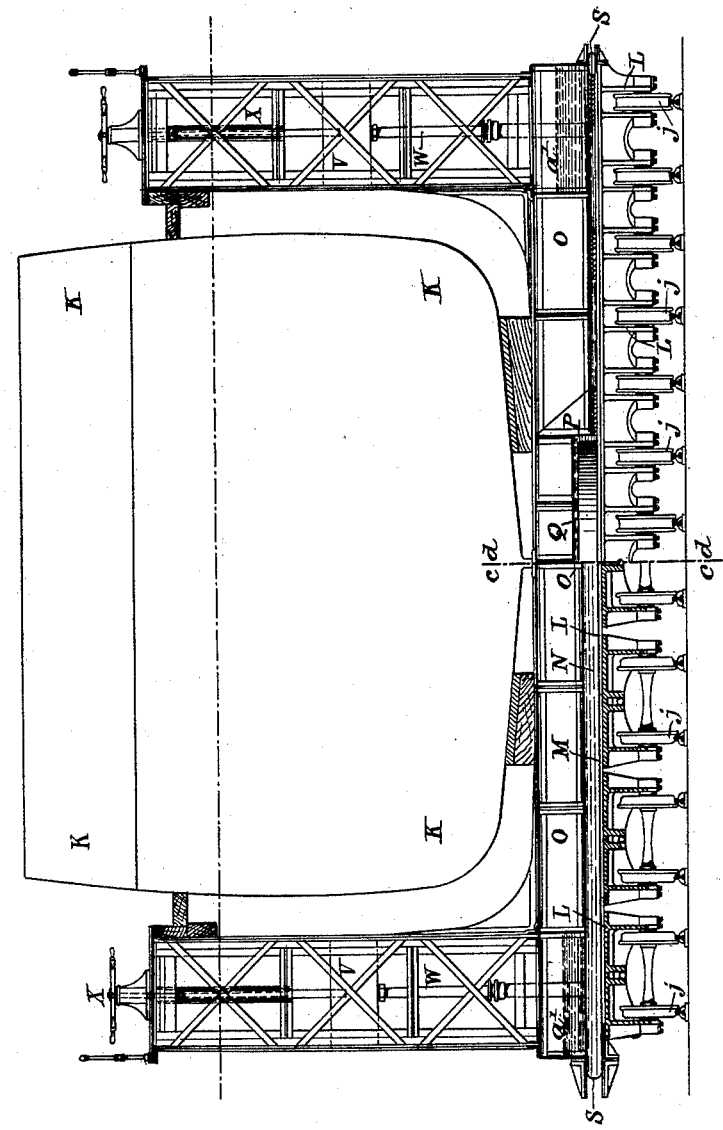
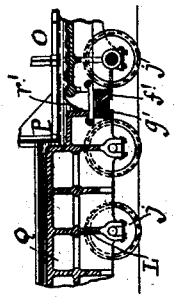
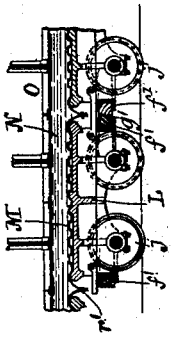

(No Model.) 5 Sheets—Sheet 3.

W. R. KINIPPLE.
APPARATUS FOR CARRYING SHIPS, &c., UPON RAILWAYS.

No. 485,044. Patented Oct. 25, 1892.

(No Model.) 5 Sheets—Sheet 4.
W. R. KINIPPLE.
APPARATUS FOR CARRYING SHIPS, &c., UPON RAILWAYS.
No. 485,044. Patented Oct. 25, 1892.
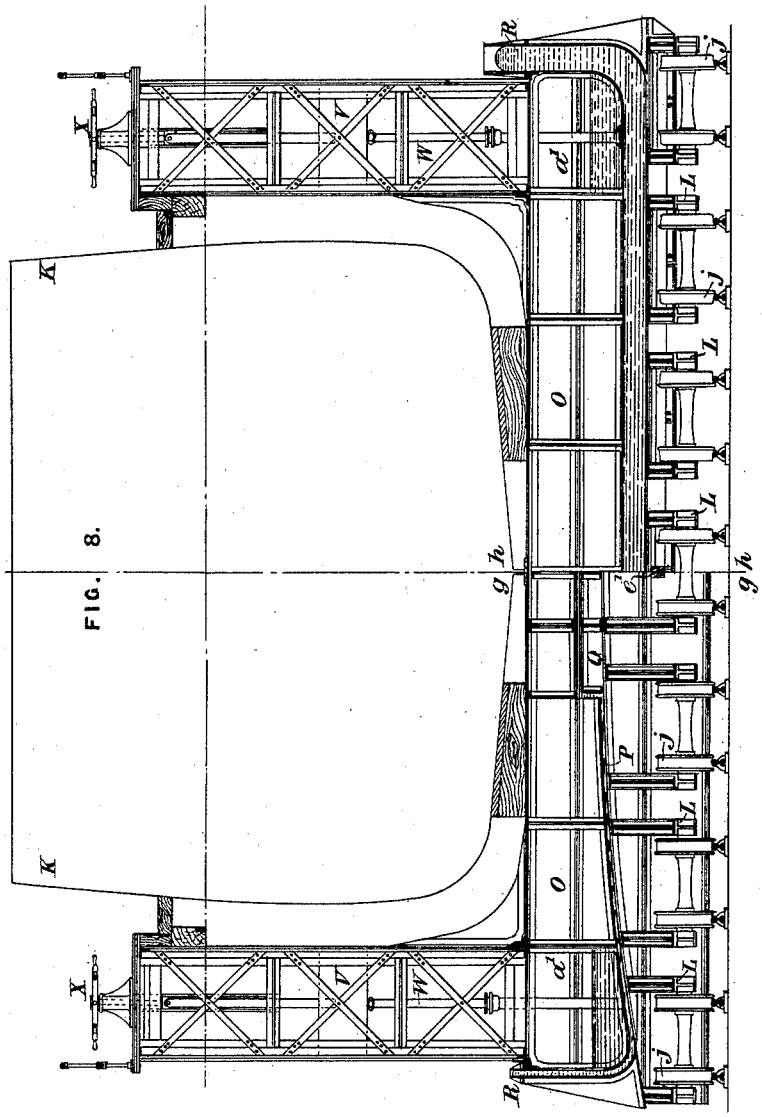
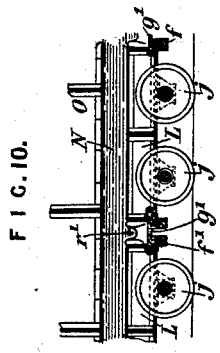
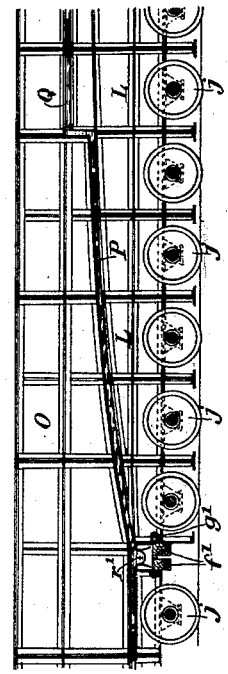

(No Model.) 5 Sheets—Sheet 5.
W. R. KINIPPLE.
APPARATUS FOR CARRYING SHIPS, &c., UPON RAILWAYS.
No. 485,044. Patented Oct. 25, 1892.
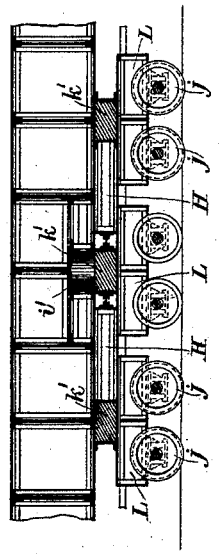
FIG. 15.
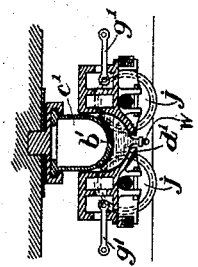
FIG. 13.
FIG. 14.
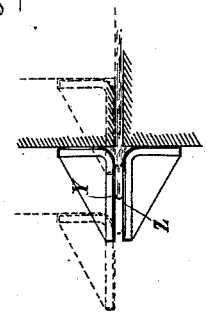
FIG. 11.
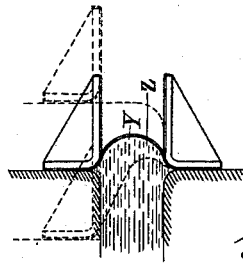
FIG. 12.
Attest:
Geo. T. Smallwood
Reeve Lewis
Inventor:
Walter R. Kinipple
by Falco R. Mauro
his attorneys.

UNITED STATES PATENT OFFICE.

WALTER ROBERT KINIPPLE, OF LONDON, ENGLAND.

APPARATUS FOR CARRYING SHIPS, &c., UPON RAILWAYS.

SPECIFICATION forming part of Letters Patent No. 485,044, dated October 25, 1892.

Application filed June 2, 1892. Serial No. 435,300. (No model.)

*To all whom it may concern:*

Be it known that I, WALTER ROBERT KINIPPLE, civil engineer, a subject of the Queen of Great Britain and Ireland, residing at 3 Victoria Street, in the city of Westminster, London, England, have invented certain Improvements in Cars or Apparatus for Carrying Ships or other Large and Heavy Bodies upon Railways, of which the following is a specification.

The invention relates to cars or apparatus by means of which ships or other large and heavy bodies may be safely conveyed on railways having curves and gradients, and has for its object to provide improved arrangements or constructions of such cars or apparatus. I will refer to the body to be conveyed as a "ship," which will be understood to mean, also, any other article to which the invention is applicable. For the safe transport of ships on railways provision has to be made for the deviations in a horizontal plane caused by curvatures of the line, and, further, for the deviations in a vertical plane caused by the changes of gradient. Such deviations are provided for in my invention in the following manner, viz: I construct a car with a number of wheels proportionate to the dimensions and weight of the ship to be carried and attach such wheels, either singly or in groups of two or more, as trolleys or bogies, by means of framework to a structure (preferably of iron or steel) of corrugated or partly-corrugated form, which structure by means of its corrugated or partly-corrugated form will be sufficiently flexible to adapt itself to the horizontal and vertical deviations of the railway. On the top of this corrugated or partly-corrugated structure I place what I term "hydrostatic double-ended compensating rocking bellows," which contain water or other fluid and so act that at the changes of gradient of the railway one half of each bellows would be raised and the other half lowered, the bellows thus accommodating themselves to the varying changes of level and keeping a constant pressure upon the under side of the structure on top of the bellows for carrying the ship, which structure may be a gridiron ponton or platform with or without longitudinal and cross girders, and will be strong and rigid both vertically and horizontally, so that the ship placed upon it will not be subjected to any objectionable straining action.

At or about the center of each bellows I provide a saddle having a spherical surface and a pivot, forming together a turn-table, which will allow the structure carrying the ship a limited amount of vertical and horizontal movement, by which means on passing round a curve of the railway, while the wheels and the corrugated framework connected therewith will adjust themselves perfectly to the curves, the top structure carrying the ship will be free to move slightly horizontally and vertically on the saddle in each bellows. For small ships one double-ended bellows may be used; but for larger ships two or more may be used. At the varying changes of gradient causing changes of form of the bellows the water or other fluid in the bellows will be displaced from one end to the other. A minimum quantity of water or fluid will thus suffice in connection with this arrangement, and so reduce the dead-weight to be carried.

In order to regulate the supporting-power of the bellows to suit the varying weights of ships to be carried, I provide in connection with each bellows an adjusting tank or reservoir or adjusting tanks or reservoirs containing water or other fluid, and I connect them by a pipe or pipes with the bellows, and I provide means whereby such tanks can be raised or lowered in order to attain a variable head or pressure of water or fluid in the bellows. One of the objects of the adjusting-tanks is to raise or nearly raise the rigid structure carrying the ship from off the spherical saddle, and so, in conjunction with the pivot acting as a center, to make the action similar to that of a water-borne turn-table. The sides and ends of the bellows will be closed by a flexible material—such as india-rubber or india-rubber cloth or leather, for example—protected from injury by a casing of leather, canvas, chain armor or other suitable material.

To provide for the vertical deviation, I may use, instead of bellows, a series of cups or hemispherical vessels with plungers or trough-shaped vessels, in either of which bags or containers filled with liquid are placed, such bags being connected with adjusting-tanks, such as those hereinbefore referred to. The whole of the trolleys forming the car would be connected together by a suitable draw-bar extending the full length of the car along the center line thereof.

Figure 7:
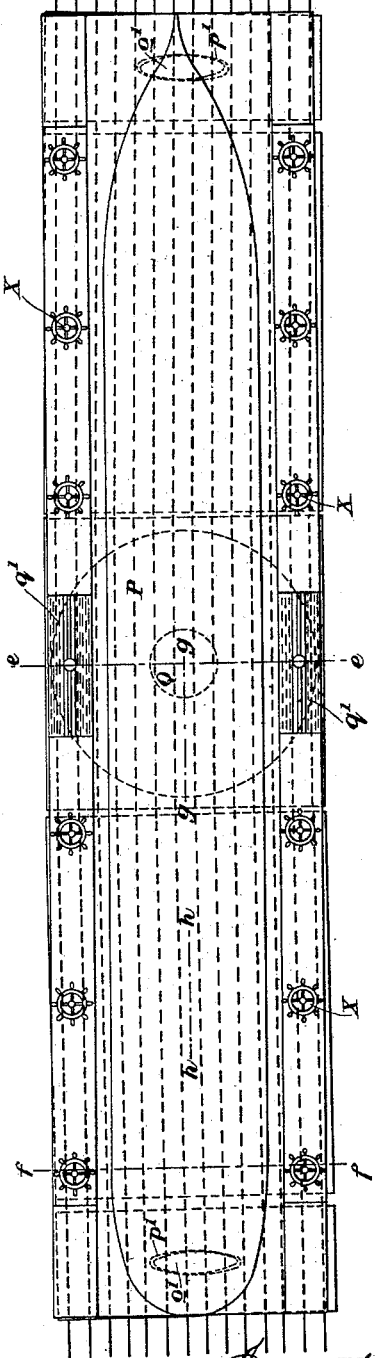

To provide for the horizontal deviations, instead of employing the horizontal curvature of the aforesaid corrugated structure, I may attach to the under side of such structure (which may or may not be corrugated) a series of girders or channel-shaped guides extending across the said structure and each pivoted thereto at the center of its length, so that it may swing freely in a horizontal plane within certain limits. Such swinging girders form guides for slide bearing-blocks attached to the upper side of the framework of trolleys having two or more wheels. To each swinging girder there will be a trolley for each line of rails, such trolleys preferably not being connected longitudinally. Transversely they might be connected or kept separate, as desired. When the car passes round a curve of the railway, each swinging girder will turn about its pivot, so as to be radial to the curve, while the trolleys will move laterally and be guided by the bearing-blocks sliding inside and against the grooved girders. There should be two groups of trolleys, one under each pivot, without swinging girders, to each of which group of trolleys the said corrugated or non-corrugated structure will be connected by means of pivots or turn-tables, so that such structure will turn slightly about such pivots and keep perfectly rigid horizontally on passing round curves; and in order that my said invention may be well understood, I now proceed more particularly to set forth the system, mode, or manner in or under which the same is or may be used or practically carried into effect, reference being had to the accompanying drawings and to the letters and figures marked thereon—that is to say:

Figure 1 of the accompanying drawings is an elevation, and Fig. 2 is a plan, of a ship-car having two double-ended bellows and two pivots or turn-tables arranged in accordance with my invention. Fig. 3 is a cross-section (drawn to a larger scale) of Figs. 1 and 2, the left-hand half being taken through the bellows at $a\ a$ and the right-hand half being taken through the pivot or turn-table and bellows at $b\ b$. Fig. 4 is a longitudinal section (also drawn to a larger scale) through the bellows, trolleys, ponton, and other parts at $c\ c$, Figs. 2 and 3. Fig. 5 is a longitudinal section (to a larger scale, also) through the pivot or turn-table at $d\ d$, Figs. 2 and 3. Fig. 6 is an elevation, and Fig. 7 is a plan, of a ship-car having one double-ended bellows, with a central pivot or turn-table, a leading group and a trailing group of trolleys surmounted by double-ended bellows, with an oval guide or pin working in a slot formed in the framework in each of the said groups of trolleys or in the under side of the structure. Fig. 8 is a cross-section (drawn to a larger scale) of Figs. 6 and 7, the left-hand half of Fig. 8 being taken at $e\ e$ through the saddle, having a spherical surface and a pivot, and the right-hand half being taken through the bellows, trolleys, and other parts at $f\ f$, Figs. 6 and 7. Fig. 9 is a longitudinal section through the trolleys, saddle or pivot, bellows, portion of ponton, and other parts at $g\ g$, Figs. 7 and 8. Fig. 10 is a longitudinal section through the trolleys, bellows, and portion of ponton at $h\ h$, Fig. 8. Figs. 11 and 12 are detailed sections (drawn to a still larger scale) of the flexible margins of the bellows, showing the forms of the flexible material at different relative positions of the ponton and trolleys when traveling round curves and over gradients. Fig. 13 is a cross-section of one of the trolleys fitted, as aforesaid, with cups or hemispherical vessels with plungers (or with trough-shaped vessels with plungers) and bags connected with adjusting-tanks. Fig. 14 is a plan of a group of trolleys fitted up with guides, bearing-blocks, and a swinging girder pivoted at the center of its length to the rigid structure or ponton. Fig. 15 is a longitudinal section at $i\ i$ of Fig. 14.

I will presume in the following description that it is a ship that is to be carried.

Referring first to Figs. 1 and 2 and the detail views thereof, I construct a car with a number of wheels $j\ j$, proportionate to the dimensions and weight of the ship K K to be carried, and I attach such wheels (either singly or in groups of two or more) as trolleys or bogies by means of framework L L to a structure (preferably of galvanized iron or steel) of corrugated or partly-corrugated form M M, which may terminate at the outer edges of the trolleys at S S, (see Fig. 3,) or be turned up at its sides and ends, as shown at R R in Fig. 8, which structure by means of its corrugated or partly-corrugated form or flexible connections $r'\ r'$ between the trolleys will be sufficiently flexible to adapt itself to the horizontal and vertical deviations of the railway. On the top of this corrugated or partly-corrugated structure M M, I place what I have termed "hydrostatic double-ended compensating rocking bellows" N N, which contain water or other fluid and so act that at the changes of gradient of the railway one half of each bellows will be raised and the other half lowered, the bellows thus accommodating themselves to the varying changes of level, as shown by Figs. 11 and 12, and keeping a constant pressure upon the under side of the rigid structure O O on the top of the bellows for carrying the ship K K, which rigid structure O O may be a gridiron, ponton, or platform with or without longitudinal and cross girders, and will be strong and rigid, both vertically and horizontally, so that the ship K K placed upon it (and shoved up therein, as may be necessary) will not be subjected to any objectionable straining action.

At or about the center of each bellows I provide a saddle P P, having a spherical surface and a pivot Q Q, forming together a turn-table, which will allow the rigid structure O O, carrying the ship K K, to have a limited amount of vertical and horizontal movement, by which means on passing round a curve of the railway, while the wheels $jj$ and the corrugated framework connected therewith will properly adjust themselves to the curves, the top or rigid structure O O, carrying the ship K K, will be free to move slightly horizontally and vertically on the saddle P P and around the pivot Q Q in each bellows. For small ships one double-ended bellows may be used, but for larger ships two or more may be used.

At the varying changes of gradient causing changes of form of the bellows (see Figs. 11 and 12) the water or other fluid in the bellows will be displaced from one end T to the other U. (See Figs. 1 and 6.) A minimum quantity of water or fluid will thus suffice in connection with this arrangement, and so reduce the dead-weight to be carried.

In order to regulate the supporting-power of the bellows to suit the varying weights of ships to be carried, I provide in connection with each bellows an adjusting-tank V or reservoir or adjusting tanks or reservoirs containing water or other liquid, and I connect them by a pipe W or pipes with the interior of the bellows, and I provide screws X X or other means, whereby such tanks can be raised or lowered, in order to obtain a varying head or pressure of water or fluid in the bellows. One of the objects of the adjusting-tanks is to enable the rigid structure or ponton O O, carrying the ship, to be raised or nearly raised from off the spherical saddle P P, and so, in conjunction with the pivot Q, acting as a center, to make the action similar to that of a water-borne turn-table.

The sides and ends of the bellows are closed by a flexible material Y—such as, for example, india-rubber, india-rubber cloth, leather, or copper, or steel galvanized, or other suitable material—protected from injury by a casing of leather, canvas, chain armor, or other suitable material at Z; and, further, in order to so adjust the rigid structure and keep it in a vertical position laterally as soon as it is just clear of the saddle I provide tanks $a'$, into which water or weights may be placed, so that any inequality in the weights of the sides of the rigid structure and ship may be balanced or adjusted.

To provide for the vertical deviations, I may use, instead of bellows, a series of cups or hemispherical vessels $b'$ in the trolleys (see Fig. 13) with hemispherical plungers $c'$ or trough-shaped vessels with trough-shaped plungers, in either of which bags $d'$ or containers filled with liquid are placed, such spherical or trough-shaped bags being connected with adjusting-tanks V by pipes W, like those hereinbefore described. In the case of cups or hemispherical vessels each trolley is so constructed as to carry one hemispherical cup with its plunger; but in the case of troughs and trough-shaped plungers two or more trolleys may be built together, so as to carry the trough-shaped vessel, or in the case where the sides and ends of the corrugated or partly corrugated structure are turned up, as shown at R R, Fig. 8, the aforesaid hemispherical vessels or trough-shaped vessels, together with the containers, in connection with adjusting-tanks, may be placed inside the said corrugated structure under the ends of and for the purpose of balancing or adjusting the rigid structure and ship on the central spherical saddle.

The trolleys forming the car are connected together by a suitable draw-bar $e'$, extending the full length of the car along the center line thereof. The lines or trains of trolleys on each side of the said center line will have bumping-blocks $f'$ and linked connections $g'$, so arranged as to allow the exact circumferential difference in each length of the different lines of trolleys due to the radius of each curve along which the trains of trolleys travel. The spaces or distances at the junctions between the trolleys connected by the corrugated floor or by flexible materials $r'$ $r'$ will be adjusted in proportion to the circumferential increase or decrease of length of the several trains of trolleys while passing round curves.

To provide for the horizontal deviations, instead of employing the horizontal curvature of the aforesaid corrugated structure M M, I may attach to the under side of such structure (which may or may not be corrugated) a series of guides, each consisting of the parallel girders H' H', (see Figs. 14 and 15,) extending across the said structure, forming a channel in which one line of bearing-blocks $k'$ slidingly engage, and bracing-girders H H, which also serve as guides for adjacent rows of bearing-blocks $k'$. Each of said guides is pivoted at about the middle of girders H' H' to the under side of the structure M, allowing them to swing freely in a horizontal plane within a certain limit. When the car passes round a curve of the railway, each swinging girder will turn about its pivot $i'$, so as to be radial to the curve, while the trolleys will slide laterally and be guided by the bearing-blocks $k'$ $k'$, sliding inside and against the grooved girders H at $h'$. There should in every car be a group of trolleys to carry the saddle and pivot, to which trolleys the said corrugated or non-corrugated structure is connected, and by means of pivots Q and saddles P P the rigid structure will turn slightly about such pivots, as in a water-borne turn-table, and be kept perfectly rigid horizontally on passing round curves.

In Figs. 6 and 7 the leading trolley $m'$ and the trailing trolley $n'$ are each surmounted by a double-ended rocking bellows. In each trolley there is an oval-shaped pivot or guide $o'$, working in a curved slot $p'$, formed in the framework of the trolleys, which arrangement will admit of sufficient movement of the cars in passing around curves and over grades.

The said leading and trailing trolleys and double-ended hydrostatic bellows are preferably arranged so as to balance or adjust the said rigid structure and ship on the central spherical saddle, to effect which the bellows are connected by pipes with the adjusting-tanks V, which can be raised or lowered to such levels, heights, or positions as will enable a balance to be obtained or effected thereby, as hereinbefore described, or in the case where the sides and ends of the corrugated or partly-corrugated structure are turned up, as shown at R R in Fig. 8, the aforesaid hydrostatic bellows, in connection with adjusting tanks, may be placed inside the said corrugated or partly-corrugated structure for the purpose of balancing the said rigid structure and ship.

On Figs. 1 and 6 engine-houses are shown at $q'$ $q'$, in which hydraulic pumping-machinery will be placed to provide pressure for giving motion to machinery for propelling the ship-car when in sidings and for maintaining a full supply of water in the bellows, and adjusting-tanks to be drawn either from storage-reservoirs $a'$ $a'$ or compartments provided in the rigid structure, or elsewhere.

Having now particularly described and ascertained the nature of my said invention and in what manner the same is to be performed, I declare that what I claim is—

1. In apparatus of the kind described, the combination, with suitable trucks and framework for holding a vessel, of one or more supporting-bellows interposed between the trucks and framework and adapted to compensate for deviations in the railway, substantially as described.

2. In cars or apparatus for carrying ships or other large and heavy bodies upon railways, bellows which are arranged, as hereinbefore described, to support the structure carrying the ship or body and compensate for changes of gradient, substantially as hereinbefore described.

3. The combination, with the framework for holding the vessel, hydraulic bellows, a structure upon which the same rests, and trucks, of a swinging framework consisting of cross-girders forming guides for blocks secured on the trucks, pivoted to the under side of the said structure, substantially as described.

4. In apparatus of the kind described, the combination, with the framework for holding the vessel and a flexible structure resting on the trucks and having a pivotal connection with the framework, of a compensating bellows interposed between said framework and structure, including the pivotal connection, substantially as described.

5. The combination, with the trucks and framework for carrying the vessel, the bottom of which framework forms the upper wall, of a compensating bellows, a flexible structure resting upon the trucks and forming the lower wall of the bellows, and flexible material for connecting the bottom of the framework or upper wall with the flexible structure or lower wall, thereby forming a water-tight compartment, substantially as described.

In testimony whereof I have signed my name to this specification in the presence of two subscribing witnesses.

WALTER ROBERT KINIPPLE.

Witnesses:
EDWD. GEO. DAVIES,
47 *Lincoln's Inn Fields, London, W. C.*
S. C. TANSA,
9 *Birchin Lane, London, E. C.*